(12) United States Patent
Velusamy (10) Patent No.: US 8,866,607 B2
(45) Date of Patent: Oct. 21, 2014

(54) METHOD AND SYSTEM OF PROVIDING LOCATION-BASED ALERTS FOR TRACKING PERSONAL ITEMS

(75) Inventor: Umashankar Velusamy, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 897 days.

(21) Appl. No.: 12/645,722

(22) Filed: Dec. 23, 2009

(65) Prior Publication Data

US 2011/0148625 A1    Jun. 23, 2011

(51) Int. Cl.
*G08G 1/08* (2006.01)
*G08B 21/02* (2006.01)
*G08B 21/24* (2006.01)
*G08B 13/14* (2006.01)

(52) U.S. Cl.
CPC ............ *G08B 21/24* (2013.01); *G08B 21/0275* (2013.01); *G08B 21/0269* (2013.01); *G08B 13/1427* (2013.01); *G08B 21/0227* (2013.01)
USPC ............ 340/539.13; 340/539.11; 340/539.32; 340/572.1; 340/568.1

(58) Field of Classification Search
USPC ............. 340/573.1, 568.1, 568.6, 568.7, 571, 340/572.1, 10.1, 10.32, 539.1, 539.11, 340/539.13, 539.21, 539.32
See application file for complete search history.

(56) References Cited

U.S. PATENT DOCUMENTS

| 6,331,817 | B1 * | 12/2001 | Goldberg ................... 340/573.1 |
| 6,492,905 | B2 * | 12/2002 | Mathias et al. ............... 340/540 |
| 6,989,753 | B1 * | 1/2006 | Lamming et al. .......... 340/573.1 |
| 7,034,684 | B2 * | 4/2006 | Boman et al. .............. 340/568.1 |
| 7,274,292 | B2 * | 9/2007 | Velhal et al. ............. 340/539.32 |
| 7,880,613 | B1 * | 2/2011 | Maeng ....................... 340/572.1 |
| 2005/0237196 | A1 * | 10/2005 | Matsukawa et al. ....... 340/572.1 |
| 2006/0170546 | A1 * | 8/2006 | Clifford ................... 340/539.32 |
| 2007/0120698 | A1 * | 5/2007 | Turk et al. .................. 340/686.6 |
| 2008/0174425 | A1 * | 7/2008 | Torning ........................ 340/540 |
| 2009/0085745 | A1 * | 4/2009 | Gupta et al. ............... 340/572.1 |
| 2010/0039266 | A1 * | 2/2010 | Faris et al. ................. 340/572.4 |
| 2010/0289646 | A1 * | 11/2010 | Raniere ..................... 340/572.1 |

FOREIGN PATENT DOCUMENTS

WO    WO 2008113578 A1 *  9/2008

* cited by examiner

*Primary Examiner* — Mohammad Ghayour
*Assistant Examiner* — Nay Tun (57) ABSTRACT

An approach is provided for tracking personal items. A triggering event associated with tracking a personal item is detected via a bearer tag coupled to the personal item. Sensing of the bearer tag is initiated in response to the detection of the triggering event. A determination of whether location of the personal item satisfies a predetermined criterion is made. A notification is generated if the criterion is satisfied.

16 Claims, 9 Drawing Sheets

METHOD AND SYSTEM OF PROVIDING LOCATION-BASED ALERTS FOR TRACKING PERSONAL ITEMS

BACKGROUND INFORMATION

Modern lifestyles are becoming increasingly more reliant on mobile communications devices, such as cellular telephones, laptop computers, pagers, personal digital assistants (PDAs), and the like. These devices can be used for a diversity of purposes ranging from basic communications, to conducting business transactions, to managing entertainment media, and a host of other tasks. Additional enhancements, such as location-awareness features, e.g., global positioning system (GPS) tracking, also enable mobile device users to provide unique location-based services. One area of development has been the integration of these location-based services with tracking services. However, traditionally, such effort has focused on commercial applications, e.g., shipping and inventory tracking, with little attention to consumers at large.

Therefore, there is a need for an approach that provides integration of location-based service and item tracking system that can be utilized for both personal use and commercial purpose.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing location-based alerts for tracking personal items are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although the various exemplary embodiments are described with respect to global positioning system (GPS) technology, it is contemplated that various exemplary embodiments are also applicable to other equivalent navigational and location determination technologies, for example, a technology to detect the location based on available base station of cell phone network. In addition, although various exemplary embodiments are described with respect to radio frequency identification (RFID)-based messaging, it is contemplated that various exemplary embodiments are also applicable to other equivalent proximity-based identification technologies. Further, while various exemplary embodiments are described with respect to mobile devices, it is contemplated that various exemplary embodiments are equally applicable to providing tracking services.

Figure 1:
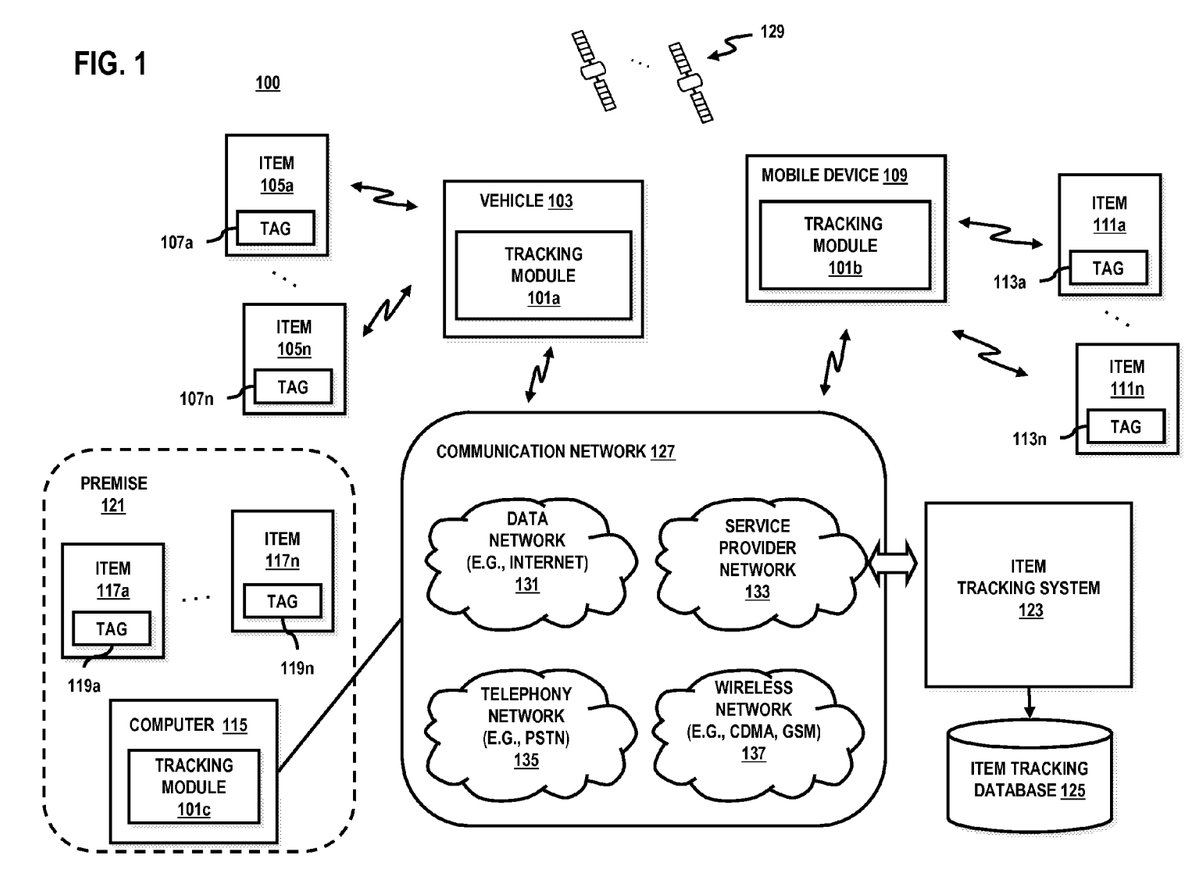
FIG. 1 is a diagram of system capable of providing item tracking and notification, according to an exemplary embodiment.

FIG. 1 is a diagram of system capable of providing item tracking and notification, according to an exemplary embodiment. It is recognized that in today's society, people routinely transport a variety of items with them, such as a cellular phone, car keys, wallets, purses, brief cases, umbrellas, etc. These items can traverse many different locations during the course of the day; e.g., home, office, restaurant, hotel, etc. Consequently, recovery of such items can be difficult (or at best, inconvenient), assuming the person even realizes that the item is not within their immediate possession.

System 100 provides for various scenarios whereby tracking of personal items can be performed using tags. The term "tag" or bearer tag refers to a chip, smart card, transponder, contactless card, near field communication (NFC) tag, radio frequency identification (RFID) tag, a wireless communication-enabled device (e.g., BLUETOOTH™ device, WiFi device, etc.), a global positioning system (GPS) transceiver, etc. In certain embodiments, personal items can include any type of movable objects that can be affixed with the tags. For example, these items can include personal effects (e.g., wallet, purse, umbrella, cellular phone, personal digital assistant (PDA), watch, suitcase, etc.), household appliances or electronics (e.g., television, laptop, desktop computer, etc.), or other personal possessions (e.g., bicycle, golf bag, sports equipment, etc.). In this manner, bearer tag identifiers may embody, for instance, a code, parameter, value, etc., that distinctly identifies one bearer tag from another. Depending on, for example, the value and/or size of an item, different bearer tags can be utilized. For example, a less valuable item, such as an umbrella, may be affixed (e.g., attached, embedded, or stored) with a passive RFID tag. In contrast, valuable items can be deployed with more sophisticated, costly tags, such as miniaturized GPS devices. With anyone of these tags, the personal items are then presence-enabled. That is, the presence (and hence location) of these items can be tracked.

As seen in FIG. 1, the tracking and notification capability can be deployed via a tracking module 101 in various scenarios. In one embodiment, tracking module 101a is implemented within a vehicle 103, so that items 105a-105n within the vicinity of the vehicle 103 can be tracked using tags 107a-107n, respectively. For example, the vehicle 103 can be equipped with appropriate instrumentation to provide wireless communication capabilities (e.g., BLUETOOTH™-enabled), such that the tracking module 101a can check for the profiles of user's personal items, e.g., cell phone, personal digital assistant (PDA), and wallet (with embedded BLUETOOTH™ transceiver), when the vehicle 103 is started. Consequently, if any of the items is not in the immediate vicinity (e.g., absent or undetectable, or outside the vicinity), the tracking module 101a can advise the user that the device is missing through a visual alert or by an announcement in the car's speaker. Furthermore, as more fully detailed below, the vehicle 103 can communicate with other tracking modules to determine the location of the missing item. In one embodiment, the vehicle 103 can also connect to a network via, for example, WiFi, to acquire the GPS location of the missing device; also, the user may communicate with the network using other mechanisms (e.g., telephony session; dialing a designated number) to obtain the location information.

Also, in another embodiment, tracking module 101b resides within a mobile device 105 for tracking items 111a-111n using tags 113a-113n, respectively. Further, a separate tracking module 101c can be implemented in a computer 115 (e.g., desktop, laptop, web appliance, etc.) to track items 117a-117n through corresponding tags 119a-119n within a premise 121, such as a home, place of business, hotel, etc. Hence, it is contemplated that the tracking module 101 can be deployed, in addition to mobile devices, in stationary systems, as computer 115 can be a desktop (which is stationary), or a laptop (which is mobile).

According to one embodiment, the tracking modules 101a-101c can be configured to operate as part of managed service by a service provider. In such a scenario, an item tracking system 123 can interface with anyone of the tracking modules 101a-101c to store data about the tracked items within an item tracking database 125. Under this tracking service, users need not be concerned about storage of the information, and the item tracking system 123 can be utilized to communicate the notification of the potentially lost item to a user via any desired method of communication (e.g., email, Short Message Service (SMS), Multimedia Message Service (MMS), etc.). Moreover, the system 123 can process historical data to yield pertinent statistical information—e.g., most frequently misplaced items, locations where users tend to lose items, etc. This collective data can be disseminated to subscribers, for example, as a suggestion for what items to consider tracking. The functional capabilities of item tracking system 123 is more fully detailed below with respect to FIG. 3. Connectivity of the tracking modules 101a-101c to the item tracking system 123 is provided by communication network 127.

In exemplary embodiment, an item 105a may have a location awareness capability to locate its position. In this matter, the location awareness capability may be activated periodically and/or may be activated by certain triggering events. Alternatively, if system resources, such as battery life, are not of a concern, the scanning may be a continual process. The location information acquired by the activation may be periodically transmitted to the corresponding tracking module 101a, or may be triggered when a certain event occurs. Also, item 105a may have its own memory to store the tracked location information. In this manner, item 105a may store its historical location information to the memory and transmit the data at a later time.

As mentioned, tags (e.g., tag 113a) can be GPS-enabled, and thus, obtain location information about the items (e.g., item 111a) to which they are affixed using GPS technology. Such technology is supported by a constellation of satellites 129. In this manner, item 111a may communicate with one or more of the satellites 129 to determine its spatial position with great accuracy and convenience, and report such location information to a corresponding tracking module—i.e., tracking module 101b. Additionally, tracking module 101b, which tracks item 111a, may employ A-GPS (assisted-GPS) to mitigate the loss of GPS signals from obstructions. When operating in A-GPS mode, tracking module 101b can provide for better in building or obstructed view spatial positional information. A-GPS information may include ephemeris data, differential GPS correction data, timing data, and other aiding data. Using the aiding (or assistance) data, tracking module 101b performs spatial positioning calculations.

Alternatively or additionally, an item (e.g., item 111n) associated with a bearer tag (e.g., tag 113n) may transmit its presence (and thus location) only by transmitting its identification information to a bearer reader (not shown) provided by the tracking module 101b. According to exemplary embodiment, tag 113n is a radio frequency identification (RFID) tag. Frequencies utilized for tag 113n and a tag reader are not limited to particular ranges. It is contemplated that various exemplary embodiments are also applicable to other equivalent proximity-based identification technologies. It is generally noted that bearer tags may be passive or active. Passive bearer tags are generally smaller, lighter, and less expensive than active bearer tags. As such, passive bearer tags may only be activated when within a response range of a suitable bearer tag reader (not shown). For instance, bearer tag reader may emit a relatively low-power radio wave field that is used to power bearer tag and, thereby, enable bearer tag to transmit suitable information stored to the device to bearer tag reader. Active bearer tags, however, may incorporate (or otherwise have access to) a power source that enables active bearer tags to actively transmit information stored to these devices, rather than reflect radio frequency signals, as in the case of passive bearer tags. Accordingly, active bearer tags may afford certain additional features, such as programmable and read/write capabilities. As such, a user may be permitted is store, for instance, suitable item profile information to active bearer tags.

According to certain embodiments, bearer tag readers contain one or more transmitters, receivers, control units, and/or antennas. As such, bearer tag readers may utilize these components to energize bearer tags, as well as demodulate and decode returned radio signals. A tag reader may periodically communicate with a bearer tag to detect, read, or otherwise receive bearer tag identifiers associated with items. Alternatively (or additionally), a certain event may trigger the activation of the system.

According to certain embodiments, the bearer tags on the items can themselves be configured to generate an audio and/or visual alert if they are out of range within each other. This can be independent from the tracking module's capabilities. For example, assuming tags 107a-107n (affixed to items 105a-105n) are BLUETOOTH enabled, these tags 107a-107n can then be paired with each other—thereby, effectively having knowledge of each other's presence. An example of items 105a-105n would be a set of luggage; hence, if one of the items 105a-105n become separated from the rest, one or more of the remaining items can be configured to generate an audio alert and/or a blinking LED indicator. In one embodiment, circuitry may exist within or in conjunction with the tag to effect a timer, whereby the alert is produced after a predetermined duration or period. This "peer" approach permits the user with immediate feedback, even if the tracking module 101a is not activated, thereby providing another layer of prevention against inadvertent loss of items.

As shown, communication network 127 encompasses one or more networks (e.g., data network 131, service provider network 133, telephony network 135, and wireless network 137). Network may be any suitable wireline and/or wireless network. For example, data network 131 may be any local area network (LAN), metropolitan area network (MAN), wide area network (WAN), the Internet, or any other suitable packet-switched network, such as a commercially owned, proprietary packet-switched network having voice over internet protocol (VoIP) capabilities, e.g., a proprietary cable or fiber-optic network. Telephony network 135 may include a circuit-switched network, such as the public switched telephone network (PSTN), an integrated services digital network (ISDN), a private branch exchange (PBX), or other like network. Meanwhile, wireless network 137 may employ various technologies including, for example, code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

Although depicted as separate entities, networks 131-137 may be completely or partially contained within one another, or may embody one or more of the aforementioned infrastructures. For instance, the communication network 127 and/or the service provider network 133 may embody circuit-switched and/or packet-switched networks that include facilities to provide for transport of circuit-switched and/or packet-based communications. It is further contemplated that networks 131-137 may include components and facilities to provide for signaling and/or bearer communications between the various components or facilities of system 100.

Figure 2:
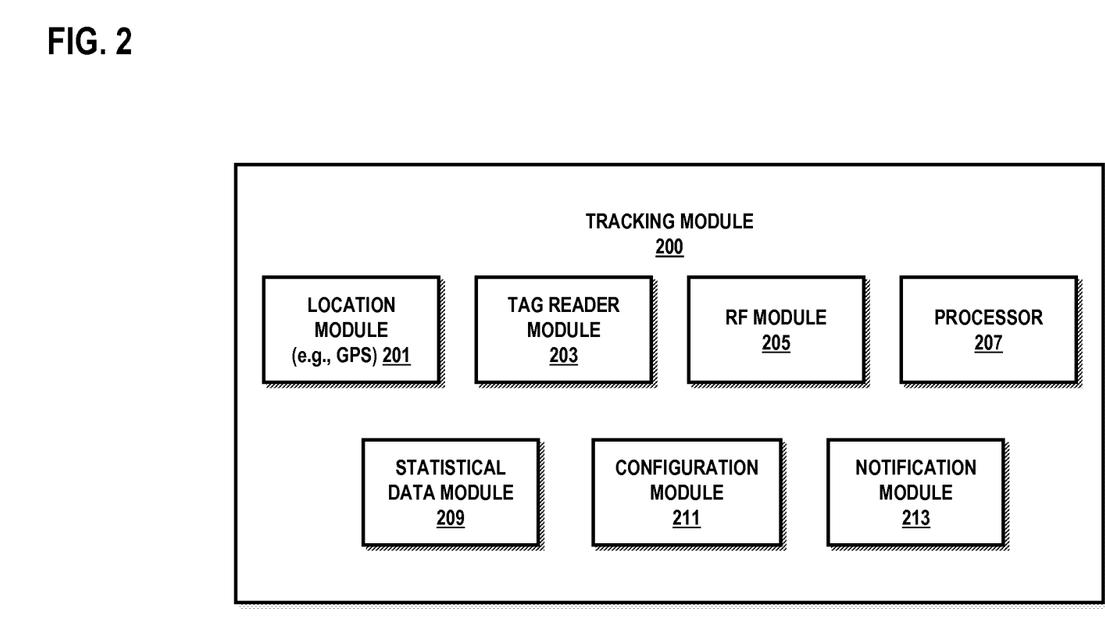
FIG. 2 is a diagram of a tracking module configured to operate in the system of FIG. 1, according to an exemplary embodiment.

FIG. 2 is a diagram of a tracking module configured to operate in the system of FIG. 1, according to an exemplary embodiment. Tracking module 200 includes a location module 201, a tag reader module 203, and radio frequency (RF) module 205, a processor 207, a statistical data module 209, a configuration module 211, and notification module 213. The location module 201 operates in conjunction with the tag reader 203 to determine location information about the personal items that are to be tracked. As mentioned, these items (e.g., items 105*a*-105*n*, items 111*a*-111*n*, and items 117*a*-117*n*) are affixed with tags, which may utilize tag reader module 203 for scanning or otherwise communicating with these items. The tag reader module 203 may include one or more readers, e.g., an RFID reader that reads RFID chips attached to the items to be tracked.

Additionally, the tracking module 200 may optionally include the RF module 205 to communicate wirelessly with various computing systems and networks. The RF module 205 can be configured to provide anyone of a number of wireless communication technologies, e.g., WiFi, BLUETOOTH™, etc. Processor 207 can execute instructions for the operation among the components of the tracking module 200.

In one embodiment, location module 201 provides or accesses a mapping application, such that the location module 201 may indicate the position or geographic area of an item within the map. The tag reader module 203 enables the tracking module 200 to detect, read or receive bearer tag identifiers associated with items to be tracked, and thereby acquire the location information of the items, when, for example, a bearer tag comes within range of the bearer tag reader module 203. According to certain embodiments, location information may be merely the presence (or absence) of an item in the vicinity of the tracking module 200, or position or area of the location of an item. In one embodiment, the location module 201 can determine its own absolute location using, for instance, a GPS receiver.

Other components of the tracking module 200 include a statistical data module 209, a configuration module 211, and a notification module 213. The statistical data module 209 can determine various statistics about the tracked items; e.g., how many times the item has been lost, where have most items been lost, time when items are typically lost, frequency of notifications, time when the notifications were sent, etc. The configuration module 211 permits a user to register the items that are to be tracked, specify the associated triggering events, what types of notifications are to be provided—e.g., the communication methods for the notification, etc. The notification module 213 has the responsibility for generating the particular notification messages or alerts according to a specified communication method. According to certain embodiments, the alerts may be in form of an audio and/or visual indicator on a graphical user interface (GUI).

In to one embodiment, tracking module 200 can account for the user's schedule or itinerary. For example, the user may input the itinerary of the user's business trip, along with a name of the hotel, and place of business. These locations can be used as triggering events. During this travel, if the user leaves the hotel without an item that is tracked, the tracking module 200 (which may be implemented a mobile phone) can provide a notification about the item.

In another exemplary embodiment, the user may create a list of lost items, such that when one or more of the listed items enters the range (or proximity) of the tracking module 200, the user may be notified of the presence (or absence) of the item.

The above arrangement enables the user to track items locally within a single area (as well as single tracking module or device), such as within the respective vicinities of computer 115, vehicle 103, and mobile 109. Alternatively, items that are tracked within these areas can be coordinated through a more global approach under a managed services scenario, as next explained.

Figure 3:
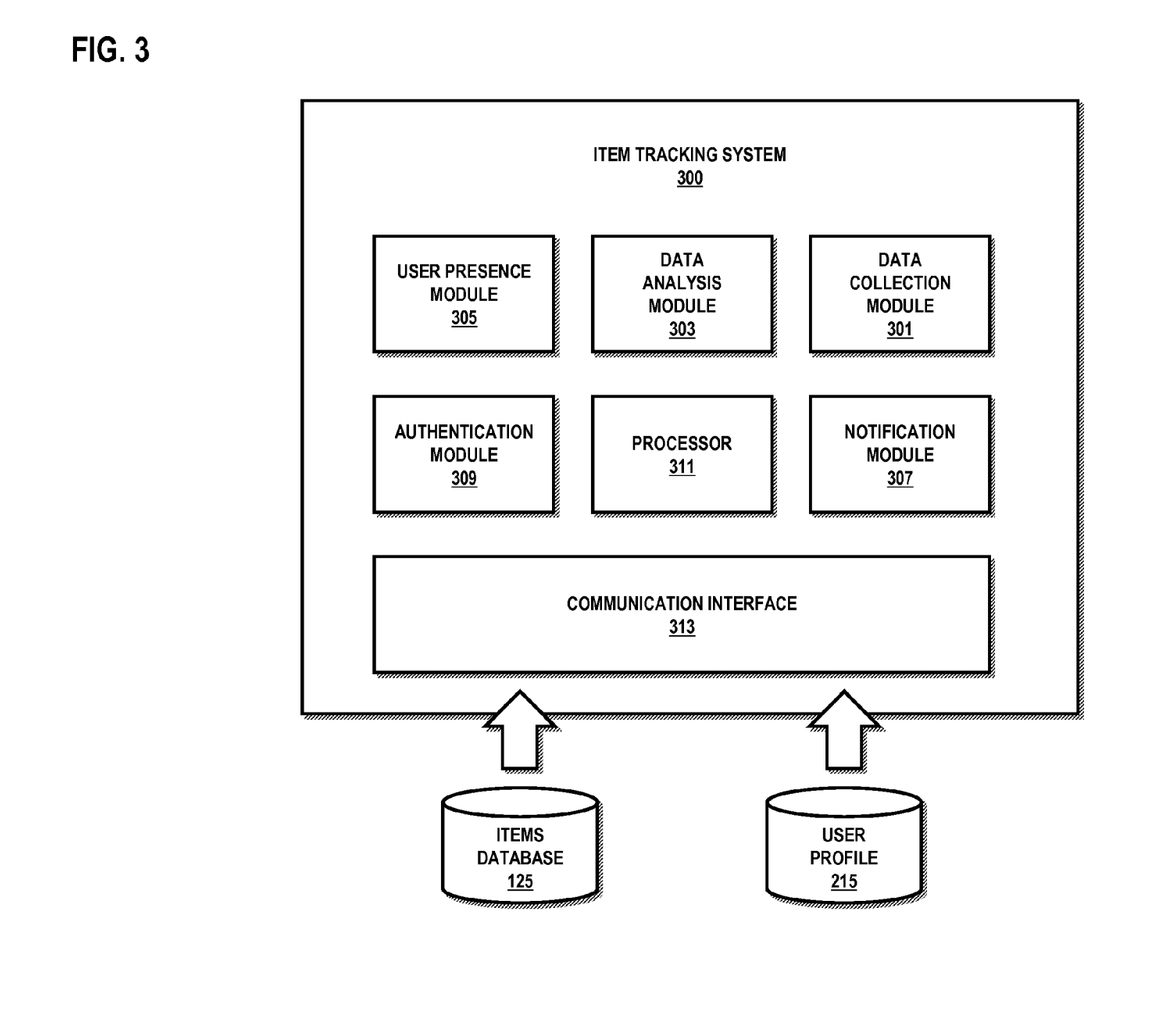
FIG. 3 is a diagram of an item tracking system configured to provide a managed tracking and notification service, according to an exemplary embodiment.

FIG. 3 is a diagram of an item tracking system configured to provide a managed tracking and notification service, according to an exemplary embodiment. Item tracking system 300 may comprise computing hardware (such as described with respect to FIG. 8), as well as include one or more components configured to execute the processes described herein. In this example, the item tracking system 300 is implemented as part of a managed service offered by a service provider, and thus, can be a part of the service provider network 133 of FIG. 1. This tracking system 300 can be configured to communicate with the tracking modules 101*a*-101*c* within, respectively, the vehicle 103, the mobile device 109 and the computer 115. As shown, the item tracking system 300 includes a data collection module 301 to gather information relating to the items via their respective tags. Assuming the vehicle 103, the mobile device 109 and the computer 115 are associated with a common user, the tracking system 300 can readily provide a comprehensive approach to tracking the user's items and providing notifications to the user using various communication methods. That is, the system 123 permits tracking of items over multiple areas and devices. Also, this managed approach permits greater visibility to where the tracked items may be. For example, if the user is around the vehicle 103 and is alerted by the local tracking module 101*a* that an item is missing, the user may have to search within the vicinity of the vehicle 103 or retrace routes encompassing prior locations. However, under the more comprehensive managed approach, the item tracking system 123 may note that the missing item is within the user's premise 121, the user can be alerted accordingly, and thus, need not expend time unnecessarily searching for it. Moreover, the user can be relieved of any distress about the lost item, particularly if the item is valuable.

A data analysis module 303 examines the collected data from the tracking modules 101*a*-101*c*. For example, the data analysis module 303 can massage the collected data to generate statistical data about the items and the user. A user presence module 305 is optionally employed to maintain presence information about the user; in this manner, communication with the user can be more efficient. A notification module 307 operates in conjunction with the data analysis module 303 to generate alerts regarding the whereabouts of the tracked items. The notification module 307 can utilize the user presence information to determine the quickest way to reach the user; for instance, if the user has designated instant messaging (IM) as a communication method, then an IM message can be generated by the notification module 307 to alert to user before the user leaves the location where the item could possibly be located. In one embodiment, the user can elect to receive the notification over multiple methods, concurrently. For example, assuming the tracking module 101b of mobile device 109 is utilized, the tracking module 101b can instruct the mobile device 109 to provide an audio and/or visual indicator as a notification that one of the items 111a-111n is out of range. In addition, the notification can be provided within an email as well. Consequently, the probability that user receives the notification is increased, as the user may be engaged in an email application on the mobile device 109 or on a nearby computer (not shown).

Other components include an authentication module 309 to ensure that users of this item tracking and notification application are authorized, as well as one or more processors (controllers) 311 for executing instructions relating to the application. One or more memories (not shown) are utilized with the system 300 for permanent or temporary storage of these instructions. Additionally, the item tracking system 300 includes one or more communication interfaces 313 to communicate with the items databases 125 and other peripheral devices or external devices. It is contemplated that the physical implementation of repository 125 may take on many forms, including, for example, portions of existing repositories of a service provider, new repositories of a service provider, third-party repositories, and/or shared-repositories.

According to one embodiment, item tracking database 125 may be accessible over communication network 127 from, for instance, the computer 115. By way of example, item tracking database 125 stores information pertaining to the tracking of the items, such an identifiers of the items, labels and descriptions of the items, notification options (e.g., email, IM, automated telephone message, etc.), triggering events for the notifications, criteria for the notification, and historical data. Historical data can include, for instance, location information of the items, items that have been lost, timing data, pattern of notifications for particular items, events that triggered the notifications, and etc. By accessing relevant information in the tracking database 125, the user (or subscriber) can determine the circumstances in which the user tends to lose items.

Access by the computer 115 to the database 125 is governed by the authentication module 309. According to one embodiment, to access to the item tracking database 125, credential information may be required by the authentication module 309. The credential information may include "log on" information corresponding to a user name, password, coded key, or other unique identification parameter, such a personal identification number (PIN). In other embodiments, the credential information may include any one, or social security number (SSN), an address (e.g., work, home, IP, media access control (MAC), etc.), or telephone listing (e.g., work, home, cellular, etc.) as well as any other form of uniquely identifiable datum, e.g., biometric code, voice print, etc.

It is contemplated that authentication can alternatively be performed by the tracking module, according to one embodiment. That is, the tracking module 200 of FIG. 2 can be configured to provide an authentication module.

The item tracking system 300 also maintains a user profile database 215 to store information about the users, including account information, user preferences (e.g., communication methods), etc. Accordingly, the user of computer 115, can, via the tracking module 101c, create, customize and manage items locally as well as through the item tracking system 300. This user can readily create and modify user profile information, e.g., user preferences, stored in the user profile database 215 to customize the tracking service.

While specific reference will be made to this particular implementation, it is contemplated that system 300 may embody other forms and include multiple and/or alternative components.

Figure 4:
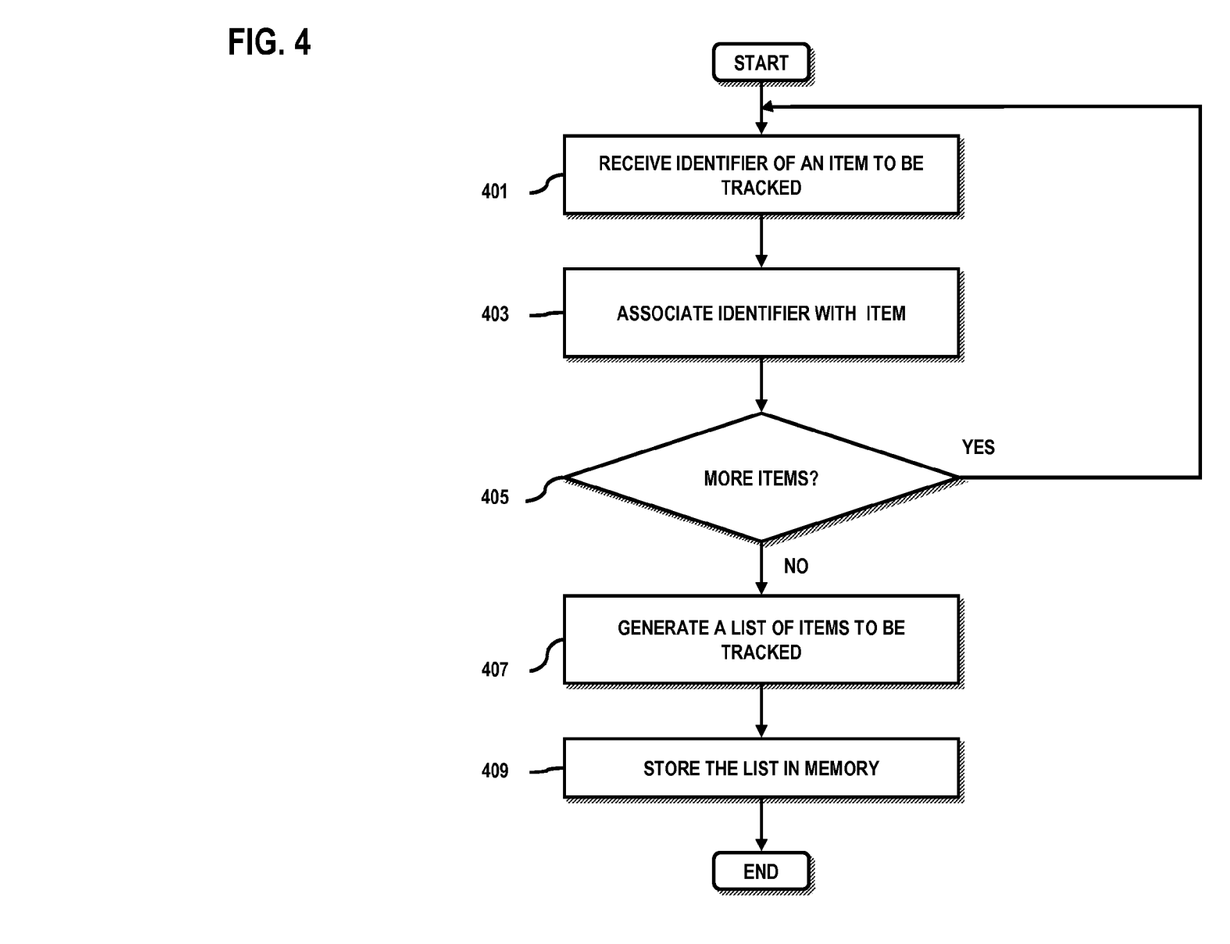
FIG. 4 is a flowchart of process for generating a list of items to be tracked, according to an exemplary embodiment.

FIG. 4 is a flowchart of process for generating a list of items to be tracked, according to an exemplary embodiment. By way of example, this process is explained with respect to the tracking module 101b of mobile device 109. It is noted that the steps of the process may be performed in any suitable order, as well as combined or separated in any suitable manner. Initially, the user needs to create a list or inventory of items that are to be tracked. In this example, the tracking module 101b receives a unique identifier to be associated with an item, per step 401. According to one embodiment, the identifier may be the tag identifier (assuming such tag identifier is unique). This information can be received in various ways, for example, by scanning a tag or via manual input by the user. In the later case, according to an exemplary embodiment, the user may enter the information through an input interface (e.g., a keyboard, a touch screen, etc.) of the mobile device 109. In step 403, the identifier may be associated with an item to be tracked, such as a wallet, keys, a suitcase, a camera, or an umbrella. In an exemplary embodiment, the bearer tag may contain pre-installed information specifying a profile of the item, in addition to an identifier. In this manner, the user may simply scan the pre-installed item profile. Also, the user may manually associate the identifier with the item profile; this association may be conducted through pre-installed templates within the mobile device 109. The user may be prompted to input more items on the list, as in step 405. Steps 401 and 403 may be repeated until all items are associated with their respective identifiers. In step 407, the tracking module 101b may generate a list of identifiers associated with items to be tracked.

Entry of the items may be stored in memory (not shown) of the mobile device 109, per step 409. In one embodiment, the created list may be transmitted to the item tracking database 125. Thereafter, it is noted that the user may add more items, and/or modify or delete the existing data.

The above process can be supported by a graphical user interface (GUI), as next described.

Figure 5A:
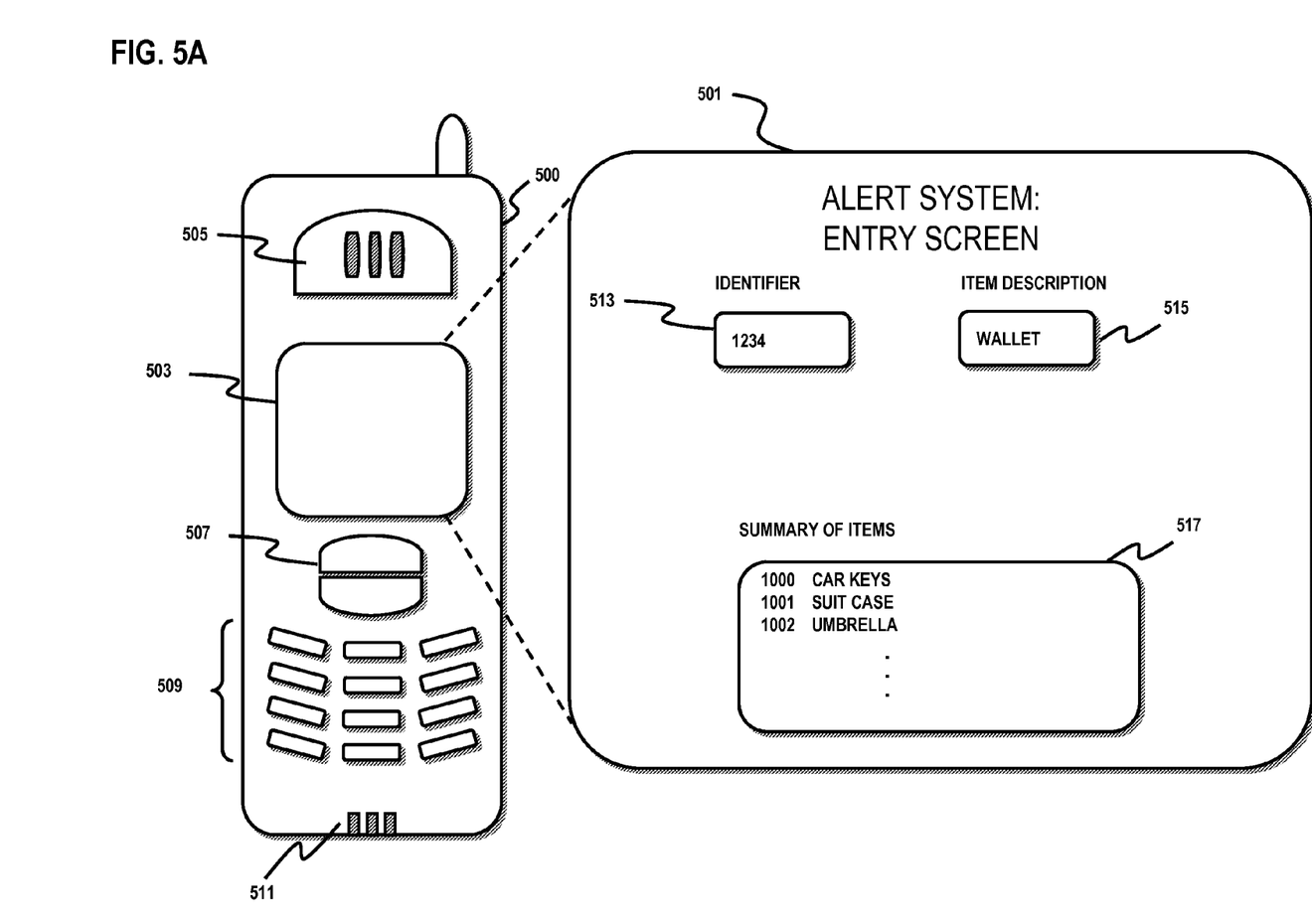
FIGS. 5A and 5B are exemplary screens of a graphical user interface (GUI) for providing item tracking and notification, according to an exemplary embodiment.
Figure 5B:
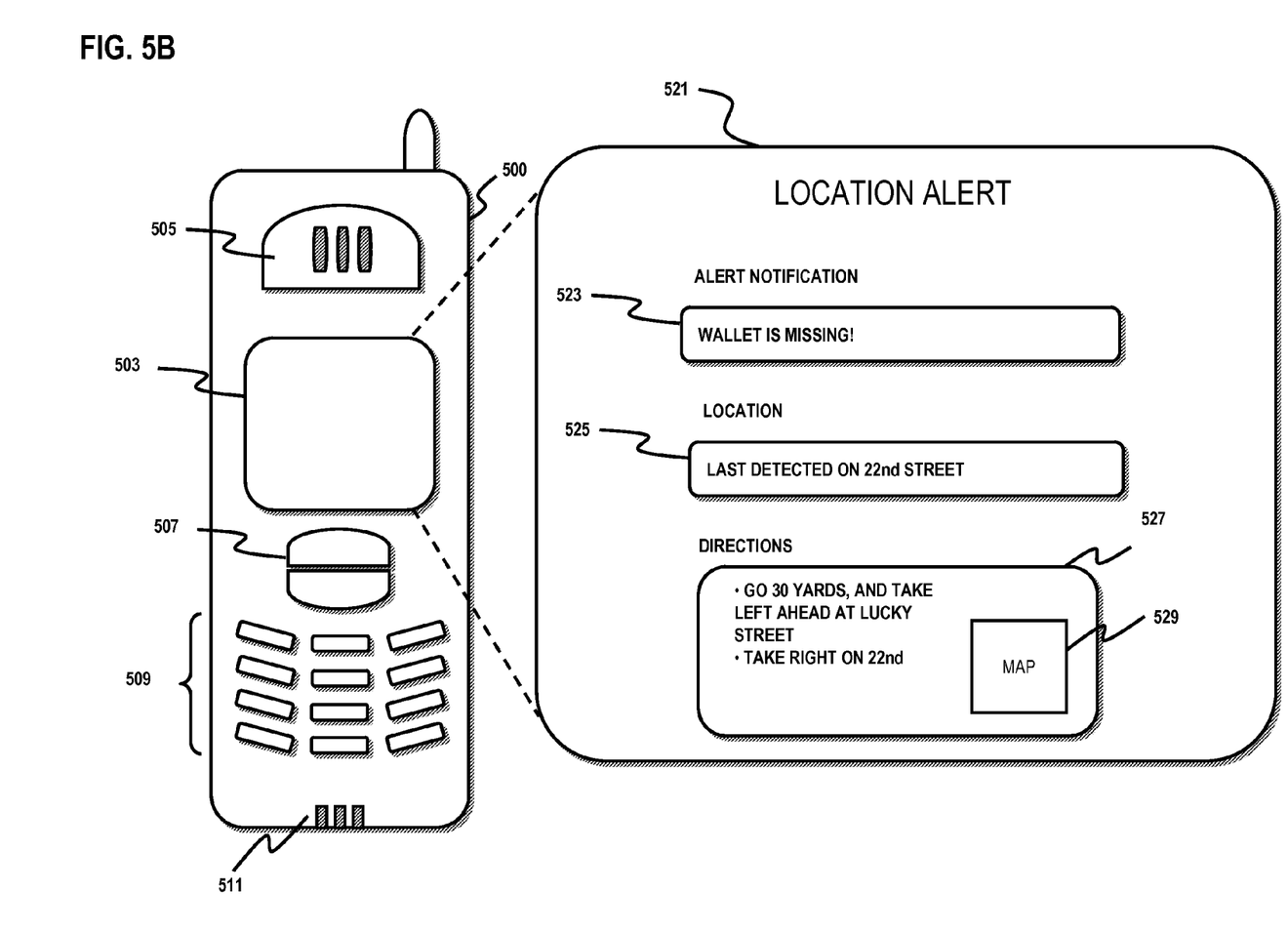

FIGS. 5A and 5B are exemplary screens of a graphical user interface (GUI) for providing item tracking and notification, according to an exemplary embodiment. In FIG. 5A, a user may employ mobile device 500 (e.g., mobile device 109) to input items that are to be tracked. For illustrative purposes, mobile device 500 is described with respect to a mobile phone, such as a cellular phone, configured to provide a GUI 501 to the user via display 503.

As shown, mobile phone 500 includes one or more transducers (e.g., speakers) 505 to output audible signals to the user. Cursor buttons 507, keypad 509, and microphone 511 enable users to interact with GUI 501 of display 503. As such, mobile device 500 is, in exemplary embodiments, also capable of speech synthesis and voice recognition. Moreover, the display 503 can be a touch-screen, such that controllers and buttons can be readily activated.

GUI 501 includes a text box 513 that illustrates an identifier associated with an item, which in this example, is a wallet, as evident from item description box 515. These boxes 513, 515 show the item that is being entered. As noted, the identifier box 513 can be automatically populated upon scanning a bearer tag, in which case, the user would specify what item this identifier is associated with (e.g., a wallet). Text box 517 provides a summary of the items that the user has provided during this data entry session as well as past sessions. Alternatively (although not shown), the GUI 501 can include a summary of "present items" for indicating only those items entered during this particular data entry session.

It is contemplated that the GUI 501 can further provide for the user to select and modify or delete the particular item(s) enumerated in box 517.

GUI 521 of FIG. 5B illustrates an exemplary notification upon detection that an item is out of range. This process is more fully described below with respect to FIGS. 6 and 7. Continuing with the example of FIG. 5A, it is assumed that the user has misplaced a wallet and has moved away from the wallet as to trigger a notification. Under this scenario, an alert notification box 523 provides the following information: "Wallet is missing!" In addition, the box 523 may indicate the last location in which presence of the wallet was detected: "Last detect on 22nd St." According to one embodiment, GUI 521 provides a directions box 527, which instructs the user how to proceed to the location that the item was last detected. For instance, the following directions are provided: "Go 30 yards, and take a left ahead at Lucky Street. Take right on 22nd." In addition, a map display 529 can be supplied to the user. Moreover, audio instructions can be concurrently played via speakers 505.

It is noted that the user can specify how and when the notification is provided, according to one embodiment. For example, the user can indicate the distance beyond which the item is away from the mobile device 500 (even though it is still within detection range). This capability will permit the user to control various aspects of item tracking, such as time to react in recovery of the missing item, prioritization of items, etc. For a value or hard to find item (e.g., luggage and wallet), the distance that triggers the alert would like be relatively small, compared to a less value item, such as an umbrella. Moreover, in the case of the umbrella, it is likely that the user will have to depart from it when entering any premise, e.g., a restaurant, and thus, the distance can be liberally set.

Figure 6:
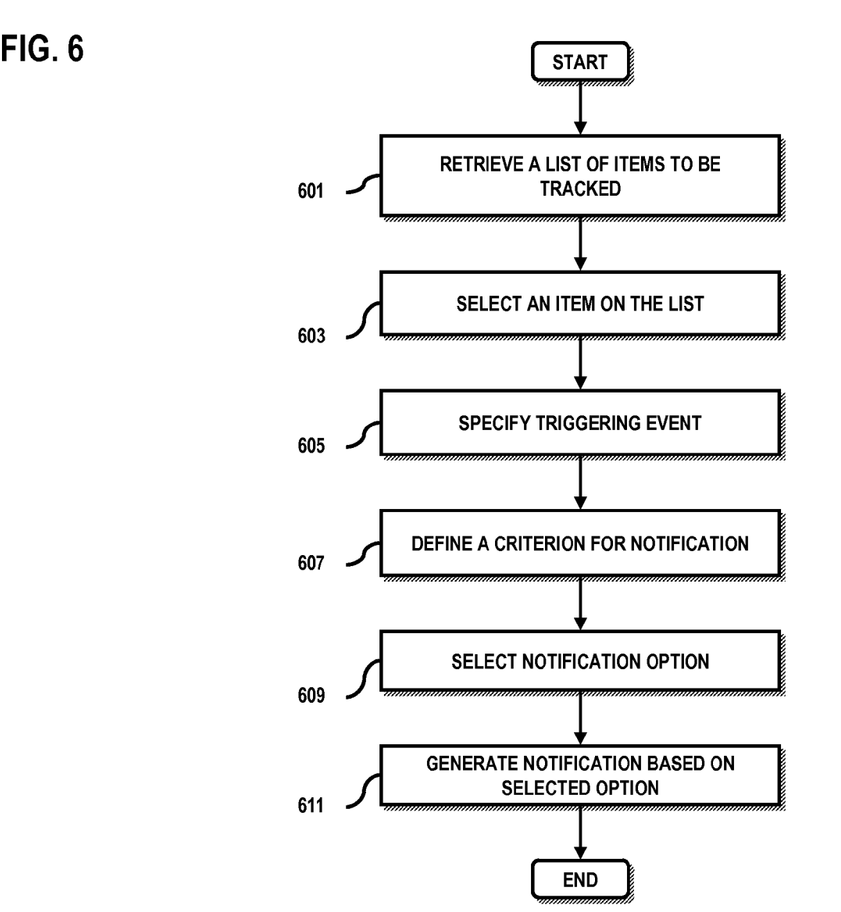
FIG. 6 is a flowchart of a process for specifying a triggering event and notification option for a tracked item, according to an exemplary embodiment.

FIG. 6 is a flowchart of a process for specifying a triggering event and notification option for a tracked item, according to an exemplary embodiment. As mentioned, the awareness capability (i.e., scanning for the items) can occur based on a schedule, an event, or a combination thereof. In this example, the user can specify the triggering events and associated notification criteria on an item by item basis. However, it is contemplated that the tracking module can provide pre-defined settings without this level of customization.

In this example, it is assumed that the items to be tracked have been specified by the user, as in the process of FIG. 4. In step 601, a list of the items is retrieved. Alternatively, the items may be retrieved one by one. At this point, the user may select one, per step 603, of the items from the list, for example, by directly inputting an identifier of an item, selecting an item from a list, or searching an item by one or more keywords. In step 605, the user can specify a triggering event for the particular item by various means. For instance, a drop down menu can be provided to the user, in which the menu shows different events that can be inputted. Such events can part of a template of activities—e.g., activation of a vehicle, user arrives at a certain location, when the tracking module cannot detect presence of one or more items (or a particular item) (i.e., absence of the items), battery level drops below a certain threshold, etc. According to one embodiment, the user may specify more than one triggering event for a particular item. For example, triggering events for a wallet may be "moving away from an office" and "leaving the user's house." Also, an actuation (or starting of the engine) of a vehicle can be specified as a triggering event.

In addition, the user may specify a certain event for multiple items. For instance, an employee's identification (ID) card and office keys may be grouped together as an "office" group, as to permit conveniently specifying the same triggering event for these items. This grouping feature can also be utilized for defining and applying the criteria for a notification.

In step 607, one or more criteria are defined for the notification. The criteria specifies the conditions upon which a notification is to be produced. According to an exemplary embodiment, the criteria include proximity (or vicinity) of the item, the time when the triggering event occurs is, for example, weekday, etc. As mentioned, multiple criteria can be specified for the same item; for example; the first criterion is that the office keys are not located within a predetermined distance (e.g., 3 feet) from a vehicle, and the second criterion is that it is a weekday. The determination of whether the item is within a certain proximity can be based on acquiring location information of the associated tag, or simply whether the tag is absent (e.g., not detectable within the proximity).

When more than one triggering event is selected, different criteria may be specified for each triggering event, even though the tracked item is the same. For example, a specified triggering event for a wallet can be when the user moves away from the a particular location, e.g., user's office, while another specified triggering event for the same wallet can be actuation of a vehicle. In this situation, a notification for the first triggering event may be that the wallet is not located within a certain distance (e.g., 3 feet) from the user's mobile device 109, while a criterion for the second triggering event may be that a wallet is not located within 5 feet from the vehicle 103. It is noted that a triggering event and a notification criterion may be similar. For example, a triggering event may be an event that a tracking module loses detection of the wallet in the vicinity; and a criterion for the notification may be that the wallet is not located in the vicinity.

Moreover, when the user selects more than one criterion for one item, the user may define whether one, some, or all criteria need to be satisfied to generate the notification.

In step 609, the user selects the notification option, and a notification is generated based on this option (step 611). According to one embodiment, the user may select different notification options for the same item based on different triggering events. For example, the user may select a notification option that is announcement of the item's description via speakers of a vehicle, for instance, "wallet is missing," for a triggering event, activation of the vehicle. On the other hand, when the user leaves his or her office without the wallet, the user's mobile device 109 alerts the user of the missing wallet by a distinctive ring tone (such ring tone can set as so that the user knows it is associated with a missing item).

In addition, the user may select more then one notification options for the same item for the same triggering event. For example, when a user leaves his or her office without a wallet, the user's mobile device 109 can provide notification by both a beeping sound and displaying an image of the missing wallet. In an exemplary embodiment, an actual picture of the item may be used as part of the image notification. Alternatively, a stock image of an item, for example, a wallet, may be used. By way of example, notification options include an alarm sound, a melody, a voice, flashing light, vibration, displaying an image of the item, or any combination thereof. According to an exemplary embodiment, notification could be implemented by sending email, text messages, voice, images and/or video. These emails, messages and etc. may be sent to a person other than the user, for example, to a cell phone of the user's family member. This notification option may be useful when a user misplaces, for example, the mobile device 109 (with the tracking module).

Furthermore, the mobile device 109 may provide notification that the criteria are satisfied, in addition to the location information, by sending an email to the user's office email account or to the user's spouse, thereby allowing the user to receive notification without carrying the mobile device 109. According to one exemplary embodiment, in addition to the notification, a list of items whose notification criteria are satisfied may be created and displayed on, for example, the display of the mobile device 109, along with the criterion that has been satisfied for each item.

Under the managed services implementation, the information generated through the processes described in FIGS. 3 and 4 may be stored in the item tracking database 125 or memory in one of tracking modules 101*a*-101*c*. In this manner, the user may add, modify and/or delete triggering events, criteria for notification, and/or notification options stored within the database 125.

According to one embodiment, these item parameters or profiles, may be added, modified and/or deleted through various devices, for example, mobile device 109, computer 115, and/or TV (not shown). The authentication module may verify user's credential information obtained via a user interface. Alternatively, as explained earlier, authentication can be performed by the item tracking system 123.

Figure 7:
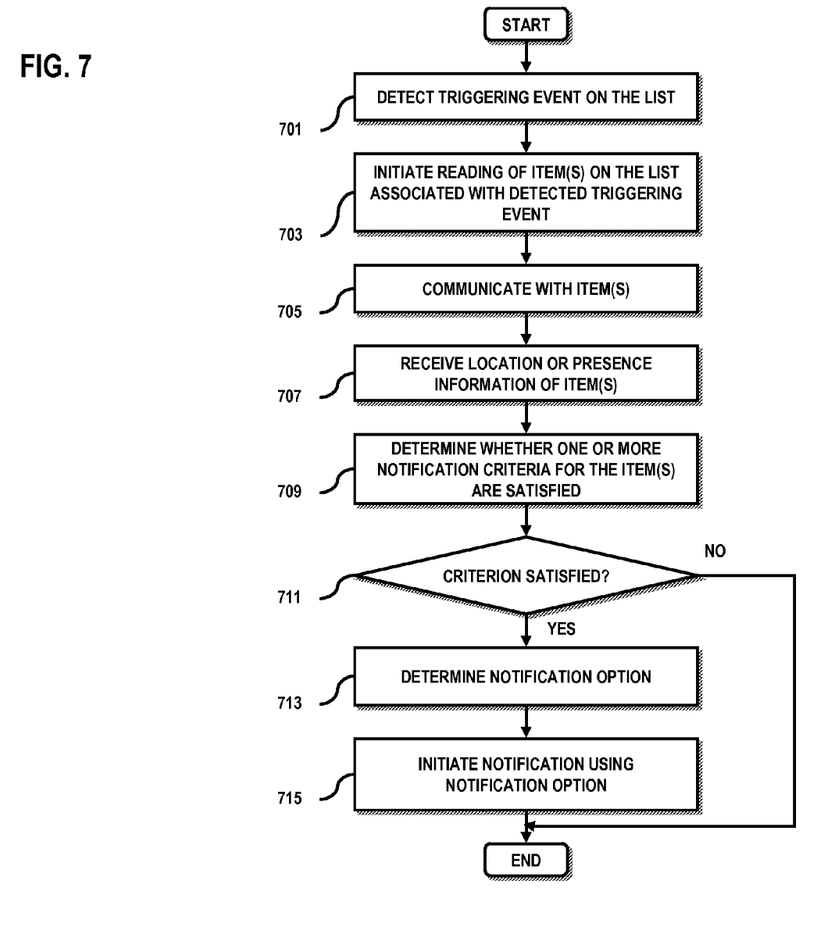
FIG. 7 is a flowchart of a process for item tracking and notification, according to an exemplary embodiment.

FIG. 7 is a flowchart of a process for item tracking and notification, according to an exemplary embodiment. In step 701, a specified triggering event is detected by a tracking module (e.g., tracking module 101*b* of mobile device 109). Thus, the tracking module 101*b* initiates reading of tags associated with the tracked items associated with the detected triggering event, per step 703. Alternatively, the user may activate the scanning process regardless of occurrence of any pre-specified triggering events. In this manner, the user may manually select one or more items to be detected from the list. Also, the user may select one or more groups of items to be detected. For example, when the user desires to check whether all the user's belongings are in the vicinity before checking out a hotel, the user may specify a particular group of items (created as "items for traveling," including a suitcase, a camera, PDA, and an umbrella) to check for their presence or absence.

In step 705, the tracking module 101*b* can initiate communication with the tags affixed to the items to acquire their location information. If the tracking module 101*b* is not able to communicate with an item directly, the tracking module 101*b* may attempt, with the assistance of the item tracking system 123 (under the managed service model) to communicate with the item through other tracking modules 101*a*, 101*c*. For example, if the tracking module 101*b* in the mobile device 109 is unable to detect the presence of a wallet, the tracking module 101*b* may, either automatically or by user's manual input, activate the tracking module 101*a* in the vehicle 103 and/or premise 121 to determine whether the wallet can be found within those areas. The communication between, for example, the vehicle 103 and the mobile device 109 may be performed directly or through communication network 127.

In step 707, location information (e.g., relative location, absolute location, and other location data) of the item(s) are received from the corresponding tags. Next, the tracking module 101*b* determines whether one or more of the specified criteria for notification are satisfied (steps 709 and 711) based on the acquired location information of the selected items. If the criteria are satisfied, the tracking module 101*b*, as in step 713, determines the associated notification option. In step 715, notification is initiated using the determined notification option. It is noted that the notification may be provided to the mobile device 109 or any other device of the user, e.g., vehicle 103 or computer 115.

As mentioned, in certain embodiments, the tracking module 101*b* may report location information along with the notification or in a separate message. The location information may be merely a description of a broader area (or range), for example, within 100 meters radius, or a more specific position.

In other example, if the item is tracked within the premise 121 by tracking module 101*c* and the tracking module 101*c* is configured with mapping information (e.g., floor plan of the premise), the user can be provided with more specific location information. For instance, a missing wallet is determined to be located in the southwest corner of the premise 121. Using the floor plan, the tracking module 101*c* may notify the user that the wallet is located in the southwest corner of the main bedroom. This location information may be viewed by the user via the computer 115, as well as other devices.

According to one embodiment, the tracking modules 101*b* and 101*c* can exchange information about the tracked items to enable a more robust experience. For example, these modules 101*b* and 101*c* can cooperate such that when a user enters the house to find the wallet (which was first detected by tracking module 101*b* of the mobile device 109 to be missing), the tracking module 101*c* in the house may detect the presence of the user by detecting the mobile device 109. Consequently, the tracking module 101*c* can instruction other devices (e.g., TV) to display the location of the wallet.

The above arrangement, according to certain embodiments, advantageously permits effective recovery of a missing item, while the user is nearby, thereby minimizing time, money, and effort.

The processes described herein for providing item tracking may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
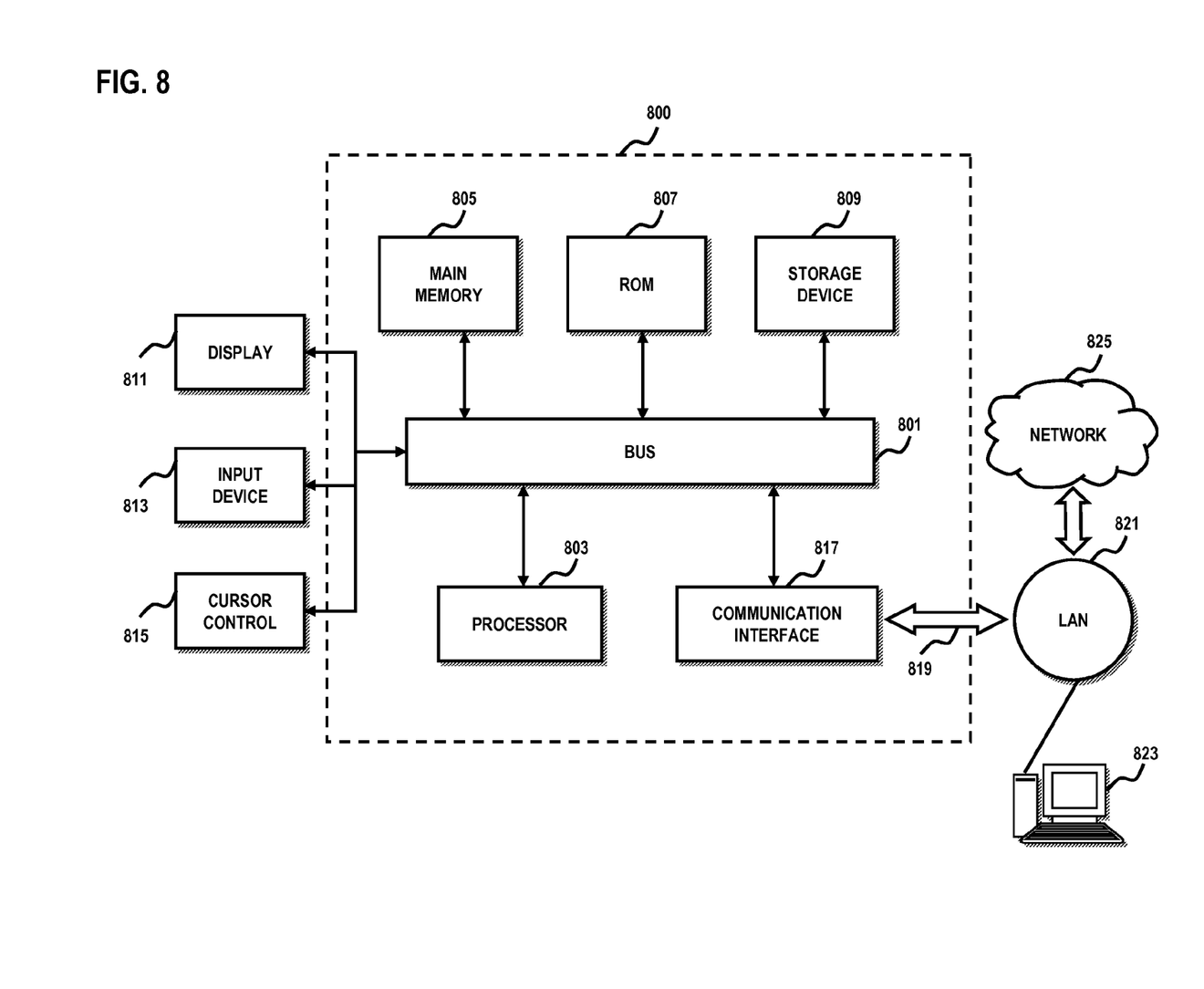
FIG. 8 is a diagram of a computer system that can be used to implement various exemplary embodiments.

FIG. 8 illustrates computing hardware (e.g., computer system) 800 upon which various exemplary embodiments may be implemented. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   detecting a triggering event associated with tracking a personal item via a bearer tag coupled to the personal item;

initiating sensing of the bearer tag in response to the detection of the triggering event;
determining whether location or presence of the personal item satisfies a predetermined criterion;
generating a notification if the criterion is satisfied, wherein the criterion for generating the notification specifies that the personal item is outside of a predetermined range from a designated object, and the notification includes time of generating the notification;
generating a list of personal items to be tracked, the list including the personal item;
maintaining a record of the personal items, the record including the location and number of notifications generated for the corresponding personal items; and
determining statistical data about the tracked personal items including the location where most notifications have been generated, frequency of notifications, and the time when notifications are typically generated.

2. A method of claim 1, wherein the designated object includes a mobile device, a stationary device, or a vehicle.

3. A method of claim 2, wherein the triggering event includes either actuating the vehicle, moving the item within a predetermined area, moving the item away from the predetermined area, or changing location of the sensing of the bearer tag.

4. A method of claim 1, further comprising:
presenting a prompt indicating a plurality of options for the notification; and
presenting the notification according to one of the options.

5. A method of claim 1, further comprising:
presenting information about the location of the personal item; and
presenting directions to the determined location of the personal item.

6. A method of claim 1, wherein the bearer tag includes either a radio frequency identification (RFID) tag, a global positioning system (GPS)-enabled device, or a near-field radio frequency transceiver.

7. A method of claim 1, wherein the sensing is performed at either a mobile communication device, or within a wireless communication device coupled to a vehicle.

8. A method of claim 1, further comprising:
generating a different notification when at least one bearer tag is out of range of the other bearer tags.

9. An apparatus comprising:
a processor configured to detect a triggering event associated with tracking a personal item via a bearer tag coupled to the personal item,
wherein the processor is further configured:
to initiate sensing of the bearer tag in response to the detection of the triggering event,
to determine whether location or presence of the personal item satisfies a predetermined criterion,
to generate a notification if the criterion is satisfied, wherein the criterion to generate the notification specifies that the personal item is outside of a predetermined range from a designated object, and the notification includes time of generating the notification,
to generate a list of personal items to be tracked, the list including the personal item,
to maintain a record of the personal items, the record including the location and number of notifications generated for the corresponding personal items, and
to determine statistical data about the tracked personal items including the location where most notifications have been generated, frequency of notifications, and the time when notifications are typically generated.

10. An apparatus of claim 9, wherein the designated object includes a mobile device, a stationary device, or a vehicle.

11. An apparatus of claim 10, wherein the triggering event includes either actuating the vehicle, moving the item within a predetermined area, moving the item away from the predetermined area, or changing location of the sensing of the bearer tag.

12. An apparatus of claim 9, further comprising:
a display configured to present a prompt indicating a plurality of options for the notification, and to present the notification according to one of the options.

13. An apparatus of claim 9, further comprising:
a display configured to present information about the location of the personal item, and to present directions to the determined location of the personal item.

14. An apparatus of claim 9, wherein the bearer tag includes either a radio frequency identification (RFID) tag, a global positioning system (GPS)-enabled device, or a near-field radio frequency transceiver.

15. An apparatus of claim 9, wherein the sensing is performed at either a mobile communication device, or within a wireless communication device coupled to a vehicle.

16. An apparatus of claim 9, wherein the apparatus is further caused, at least in part, to:
generate a different notification when at least one bearer tag is out of range of the other bearer tags.

* * * * *